RE 25720

July 10, 1962  E. A. THOMPSON  3,043,059
PRECISION FEED MECHANISM

Filed April 18, 1960  10 Sheets-Sheet 1

INVENTOR.
EARL A. THOMPSON
BY

ATTORNEY

July 10, 1962

E. A. THOMPSON 3,043,059

PRECISION FEED MECHANISM

Filed April 18, 1960

INVENTOR.
EARL A. THOMPSON
BY
Ralph L. Tweedale
ATTORNEY

July 10, 1962

E. A. THOMPSON 3,043,059

PRECISION FEED MECHANISM

Filed April 18, 1960

INVENTOR.
EARL A. THOMPSON
BY
Ralph L. Tweedale
ATTORNEY

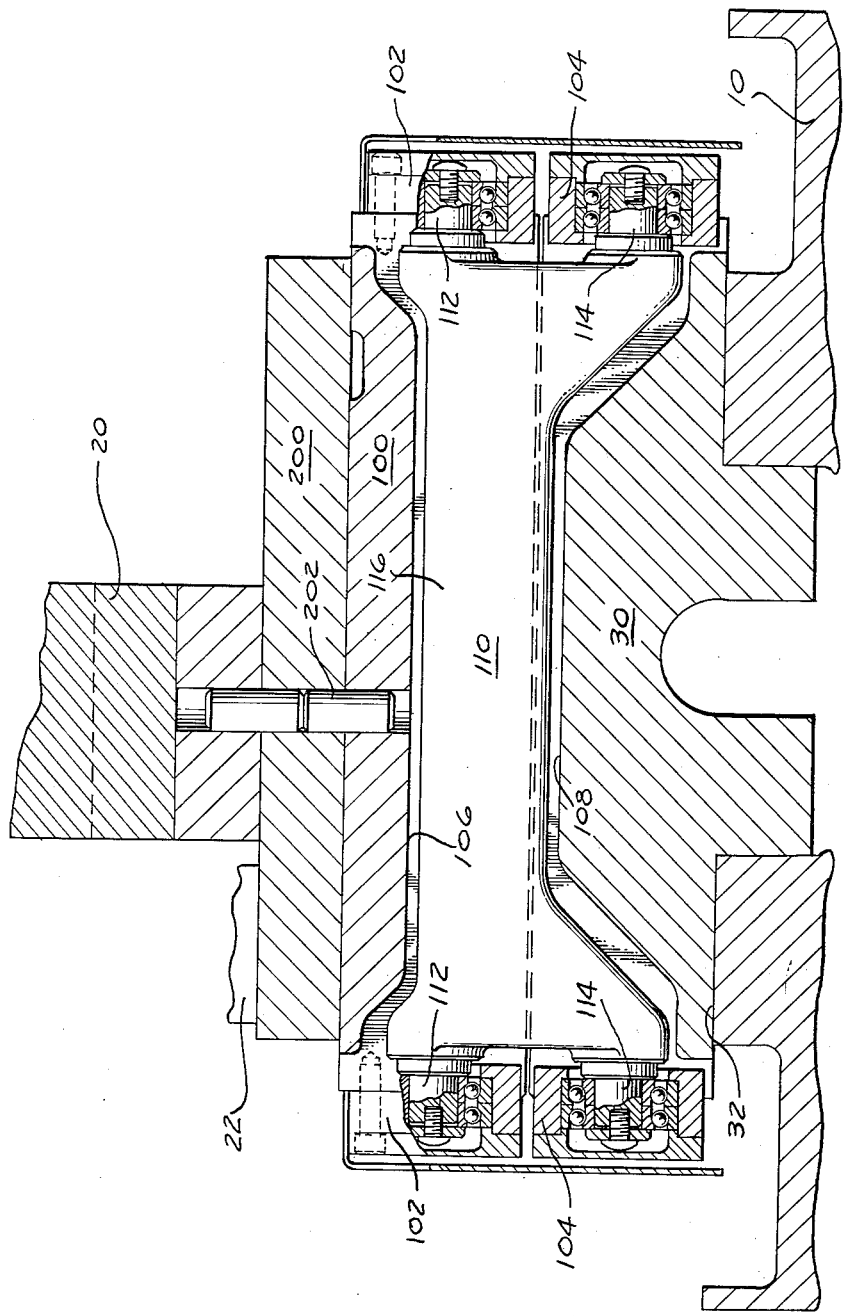

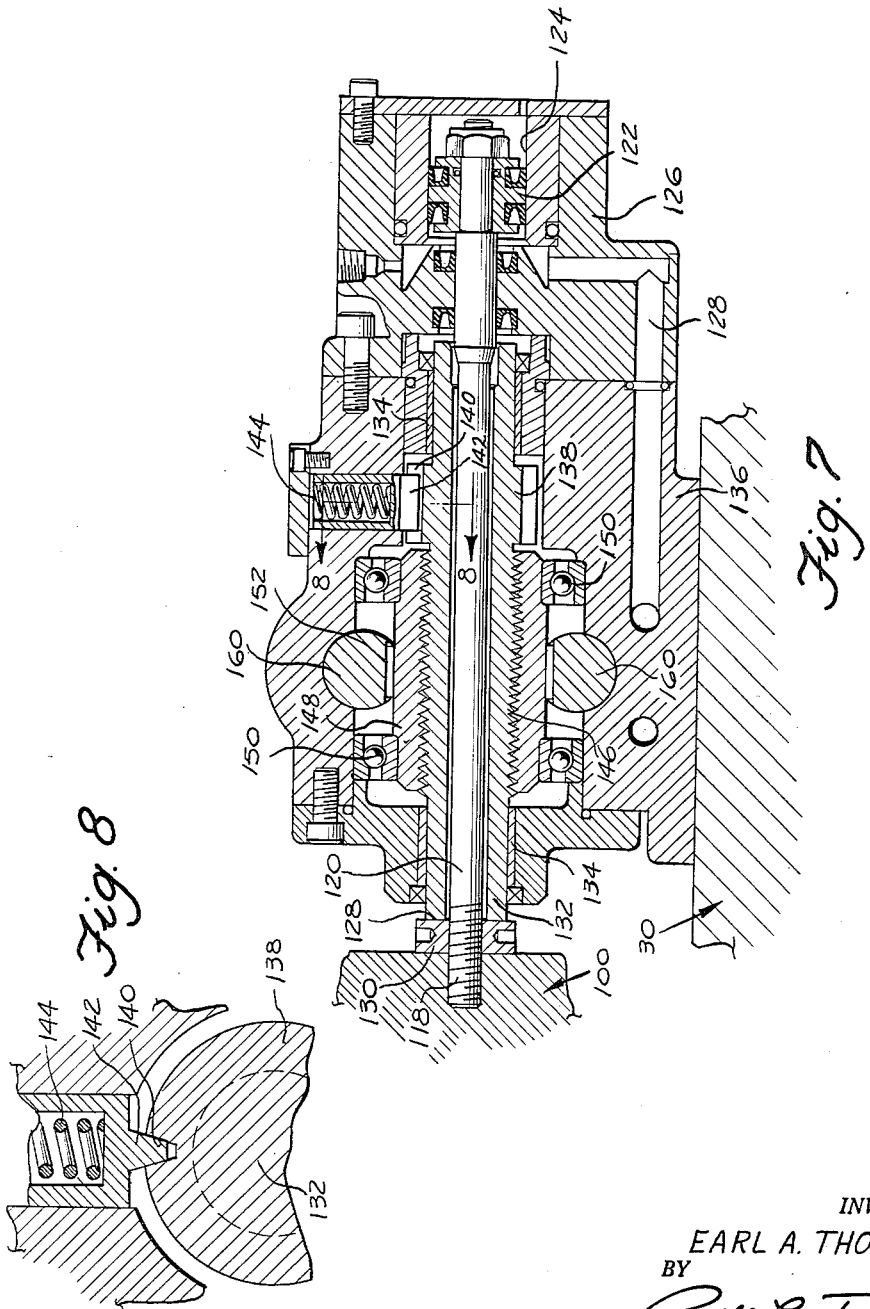

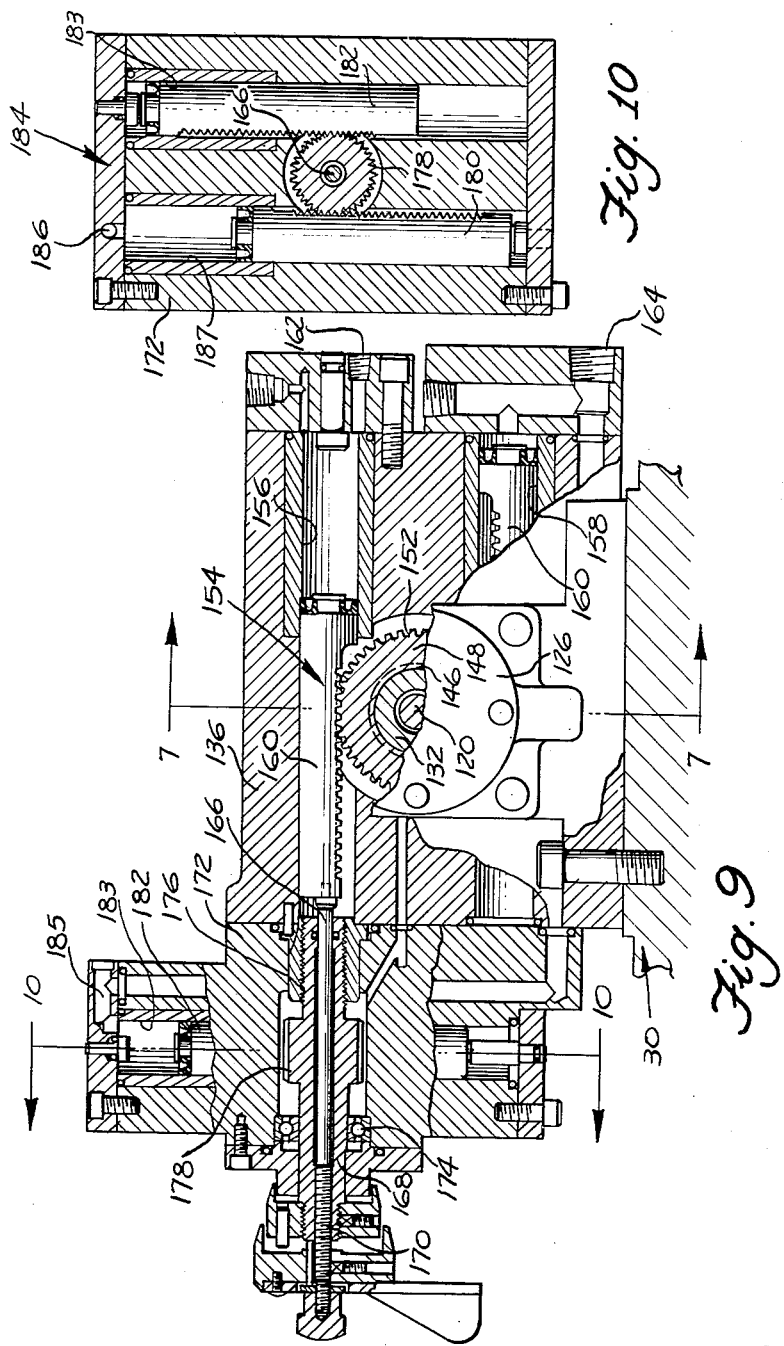

INVENTOR.
EARL A. THOMPSON
BY
Ralph L. Tweedale
ATTORNEY

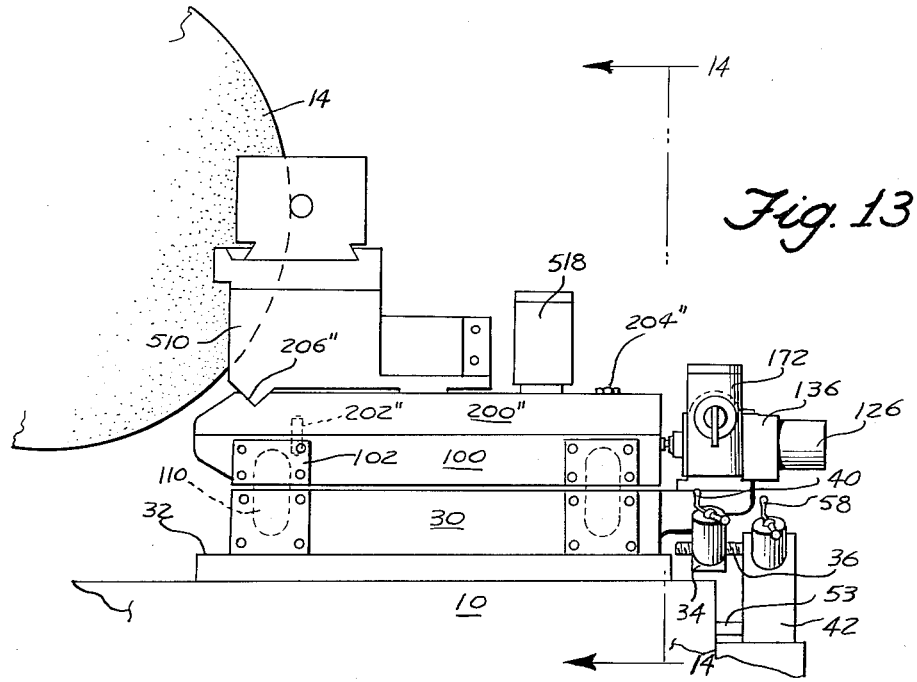
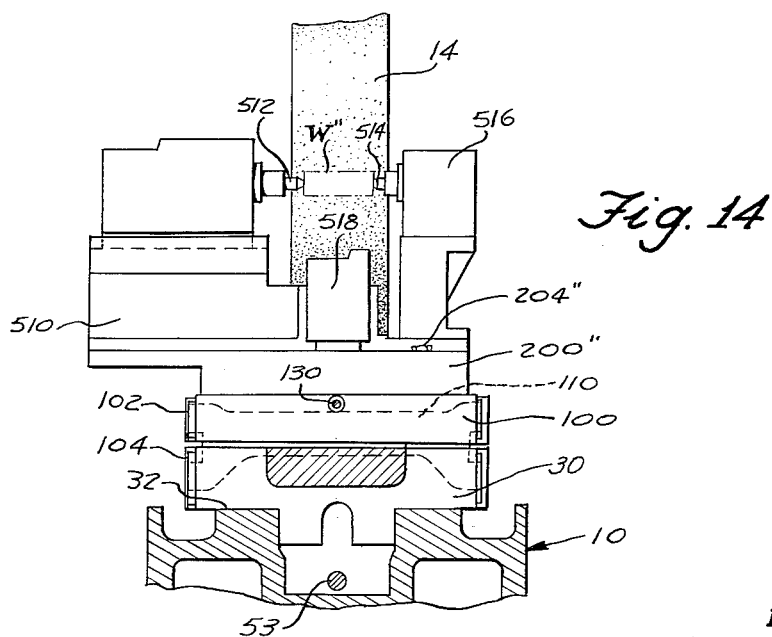

July 10, 1962 E. A. THOMPSON 3,043,059
PRECISION FEED MECHANISM
Filed April 18, 1960 10 Sheets-Sheet 10

INVENTOR.
EARL A. THOMPSON
BY
Ralph L. Tweedale
ATTORNEY

United States Patent Office 3,043,059
Patented July 10, 1962

3,043,059
PRECISION FEED MECHANISM
Earl A. Thompson, 1300 Hilton Road, Ferndale, Mich.
Filed Apr. 18, 1960, Ser. No. 22,720
20 Claims. (Cl. 51—103)

This invention relates to machine tools such as grinders. More particularly it relates to precision workpiece feeding mechanism on a multi-purpose base assembly for industrial grinders, and to anti-friction ways for overcoming "stick-slip" motion of a feeding carrier.

The commonly employed dovetail or parallel contact surface ways which guide sliding movement of heavy members on machine tools inherently have a large amount of frictional resistance which must be overcome by the power apparatus which causes the movement. The problem is severe when it is necessary to produce very small movements accurately. Consequently, in spite of careful lubrication, the sliding member sticks until initial resistance is overcome, and then slips forward relatively freely for a short distance, and then experiences varying amounts of sticking and resultant slipping during its travel; this obviously renders precise control very difficult to attain.

Attempts to overcome this problem, which prevents accurate sizing of mass produced workpieces, have resulted in air, oil, roller and ball types of anti-friction means employed in place or ordinary guide ways. However, these methods, while overcoming frictional resistance to some extent, are extremely difficult to engineer and lack the desired ability to accurately guide the heavy moving member and keep it precisely aligned in a desired direction of travel. Misalignment during travel also results in inaccurate sizing which is manifestly undesirable in high precision manufacture.

Accordingly, it is an object of the present invention to provide an improved feed mechanism for a machine tool embodying guide means that have very low frictional resistance and extreme dimensional stability to accurately steer or guide a moving member smoothly along a desired path.

Another object of this invention is to provide a plurality of support members, each having to-and-fro movement relative to the others, all of the relative movements being in the same direction of translation, whereby all of the movements except one provide adjustments for all the changing conditions found in various grinding operations, and the remaining movement is utilized exclusively for feeding successive workpieces to the grinding wheel during the actual grinding operation only.

A further object is to provide a base or bed supporting a grinding wheel as well as a first slide and a feeding carrier usable together as a single multi-purpose base assembly which can be converted to perform a number of distinct types of grinding or other operations merely by the installation of the appropriate workpiece supporting arrangements on the feeding carrier.

A further object is to provide means for guiding movement of a machine tool member, which employs pivoted links and in which anti-friction bearings at the pivot points represent the only points of contact where any frictional resistance could arise.

A still further object is to provide pivoted link guide means wherein twin links constituting a pair of parallel links are interconnected in a manner which resists torsional forces to the extent that precise parallelism is constantly maintained between the two links of a pair.

Yet another object is to provide workpiece feeding apparatus utilizing two-speed feeding movement of successive workpieces comprising a rotating nut and travelling lead screw in a unique arrangement wherein the same threads along the lead screw are engaged repeatedly at the end of each feeding movement, whereby irregularities in the threads are minimal in causing variations in the final size of a finished workpiece.

Further objects and advantages of the present invention will be apparent from the following detailed description, with reference to the accompanying drawings in which like reference characters refer to the same parts throughout the several views, and in which:

FIGURE 6 is a sectional view taken along line 6—6 of FIGURE 2 showing the torsion bar element for maintaining the guide links in parallel relationship;

FIGURE 7 is a sectional view taken along line 7—7 of FIGURE 9 showing the two speed feed means for the work feed carrier;

FIGURE 8 is a detailed fragmentary sectional view taken along line 8—8 of FIGURE 7;

FIGURE 9 is a sectional view taken along line 9—9 of FIGURE 2 showing the motor for driving the rapid portion of the feed mechanism;

FIGURE 10 is a sectional view taken along line 10—10 of FIGURE 9 showing the motor for driving the slow portion of the feed mechanism;

FIGURE 13 is a view showing still another application of the basic invention;

FIGURE 14 is a view taken along line 14—14 of FIGURE 13; and

Figure 1:
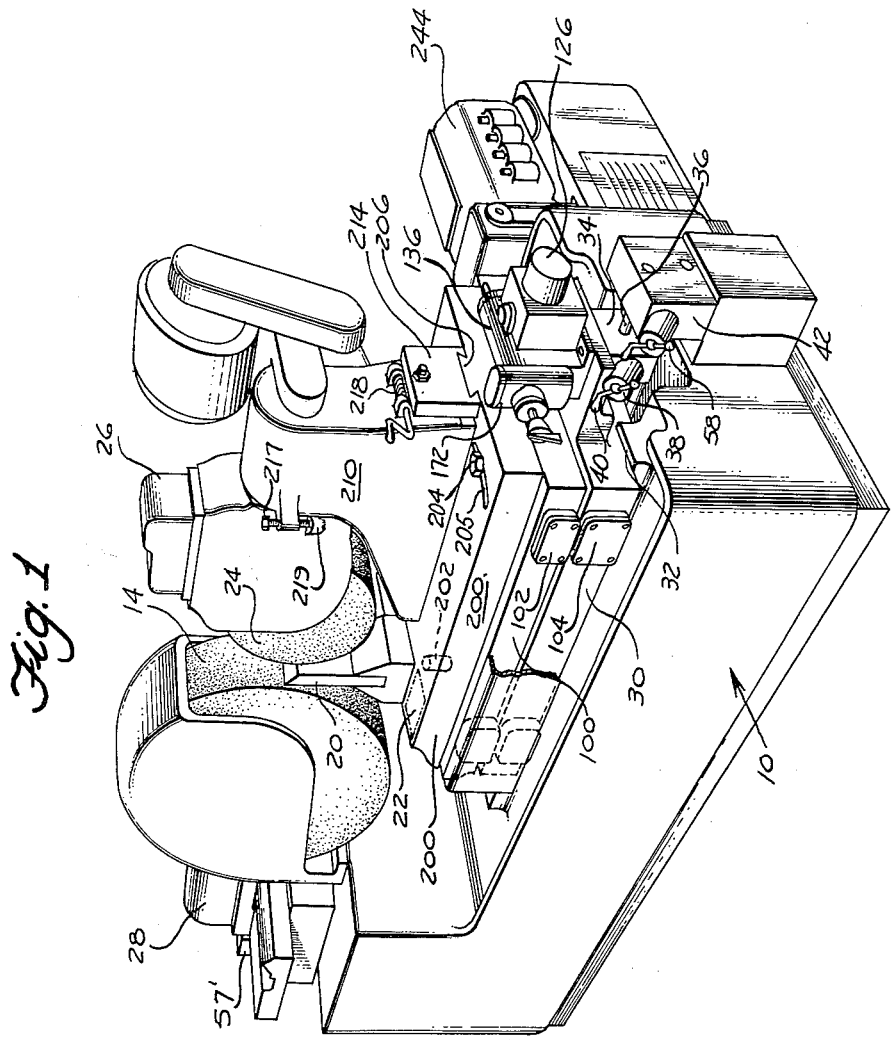
FIGURE 1 is a perspective view of an in-feed centerless grinding machine utilizing features of this invention.
Figure 2:
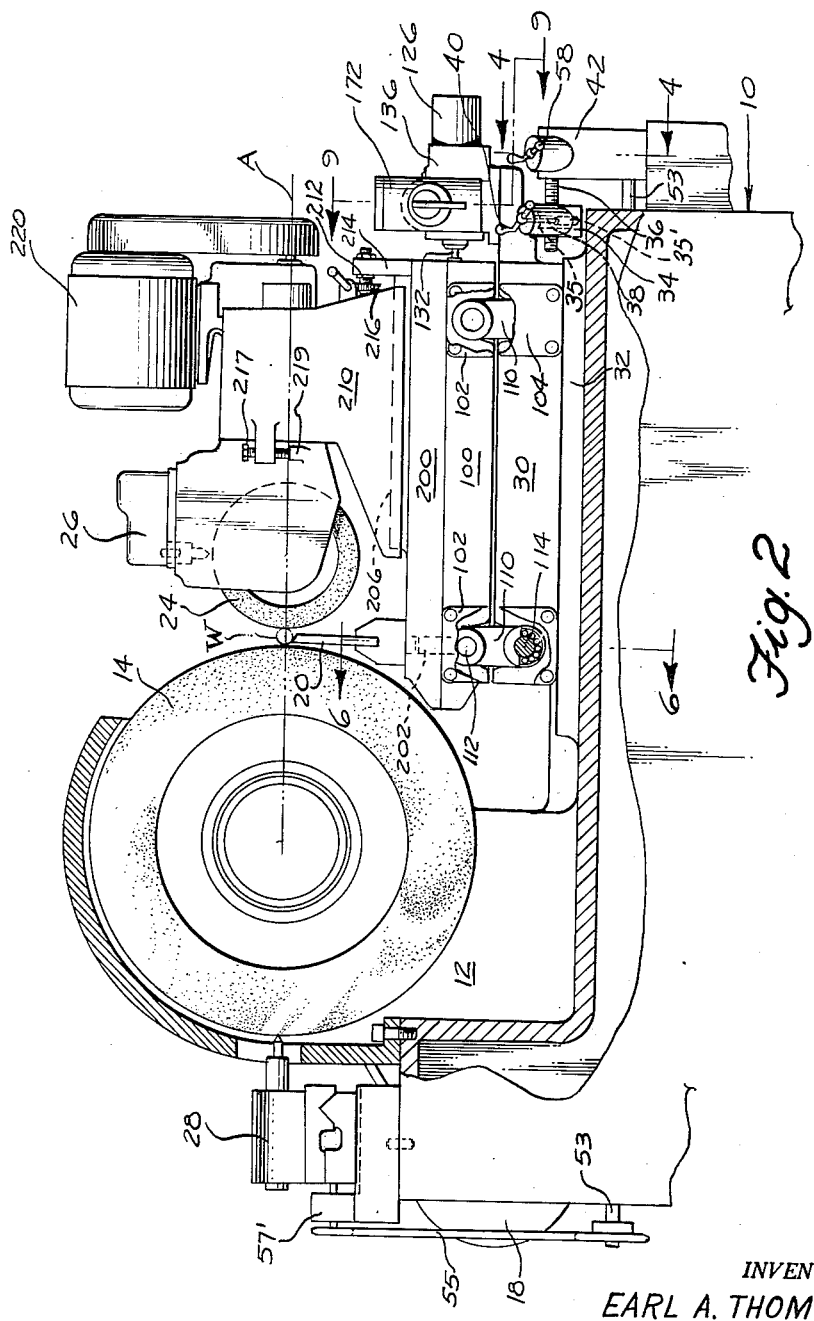
FIGURE 2 is an elevational view of the grinding machine utilizing features of this invention with parts broken away to show the parallel guide links.
Figure 3:
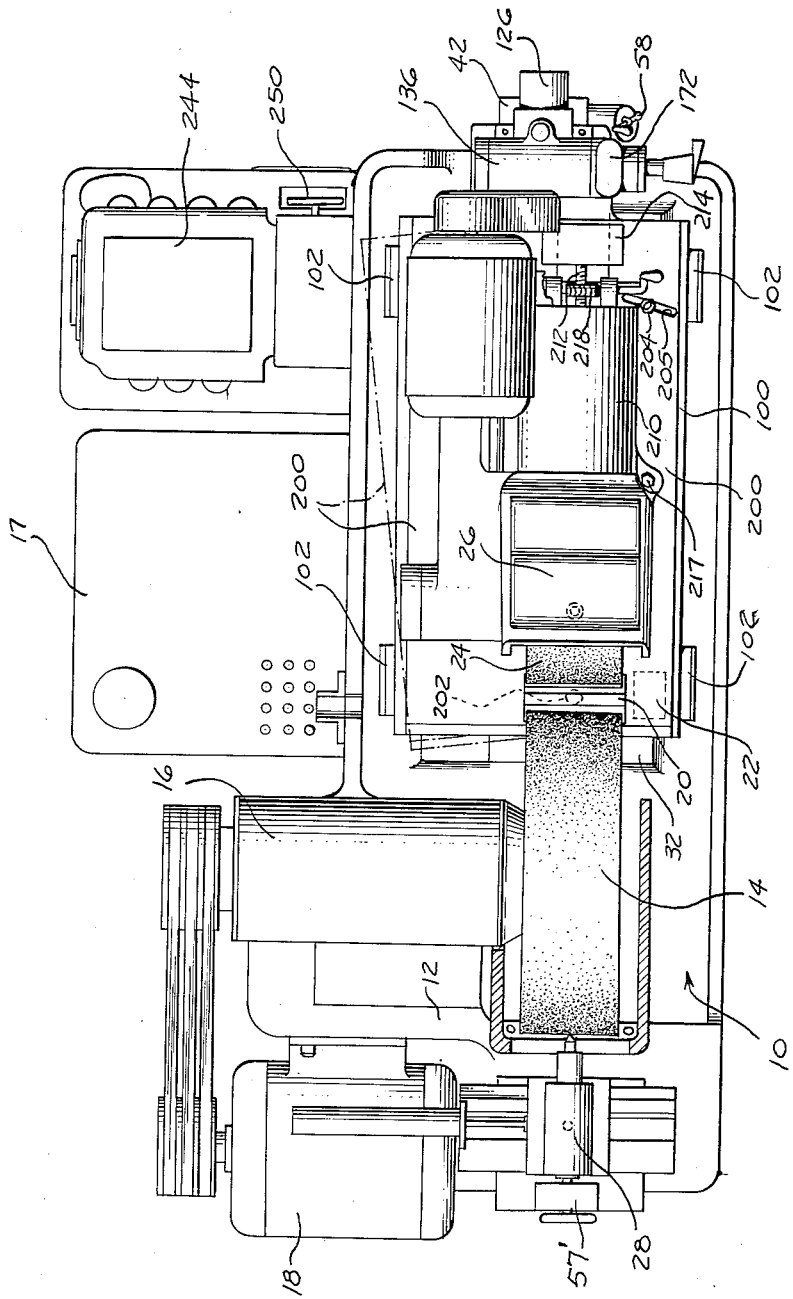
FIGURE 3 is a plan view of the machine, partly in section.

Referring to FIGURES 1, 2 and 3, there is shown a grinding machine mounted on the basic convertible assembly which comprises a base or bed 10, and a support or carrier 12 fixed on the base 10 carrying a tool such as a grinding wheel 14 which can be reciprocated axially by ordinary means schematically shown at 16, and driven by a motor schematically shown at 18. A workpiece holder or rest 20 positioned adjacent the grinding wheel may have workpieces successively fed to it by any suitable automatic loading means positioned at a location such as 22. On the opposite side of workpiece rest 20 from the grinding wheel, a regulating wheel 24 serves to hold a workpiece on the rest 20 and slowly rotate it as it is being urged against the grinding wheel during a grinding operation. A coolant tank 17 may be located adjacent the machine. Dressing mechanism for the regulating wheel is schematically indicated at 26, and dressing mechanism for the grinding wheel is schematically indicated at 28, both being supported by pivotally mounted compound slide rests. The dresser for the grinding wheel may be fed toward the wheel incrementally prior to each dressing operation by completely automatic means which will be explained later.

To adjust the machine to compensate for dressing the grinding wheel, or for a particular variety of workpiece that is to be ground by the wheel, or to move the workrest away from the wheel for various infrequent operations such as changing grinding wheels, the workrest 20 is movable in relation to the grinding wheel by means of a first support or base slide 30 mounted on the base or bed 10 and slideable thereon along ways 32. The base slide 30 has a depending housing 34 through which a lead screw 36 extends. A conventional nut 35 with worm wheel teeth on its periphery is rotatably mounted in housing 34 threaded on the lead screw 36, and is adapted to be rotated by a worm gear 35' on a conveniently angled shaft 38 which is turned by a crank 40 in the usual manner. The lead screw 36 extends also into a housing 42 upstanding on the base 10. Thus, rotation of the crank 40 serves to move the base slide 30 toward or from the grinding wheel along ways 32 in relation to the base 10. Consequently, the distance of the workrest 20 from the peripheral surface of the wheel can be regulated by the hand crank 40.

Figure 4:
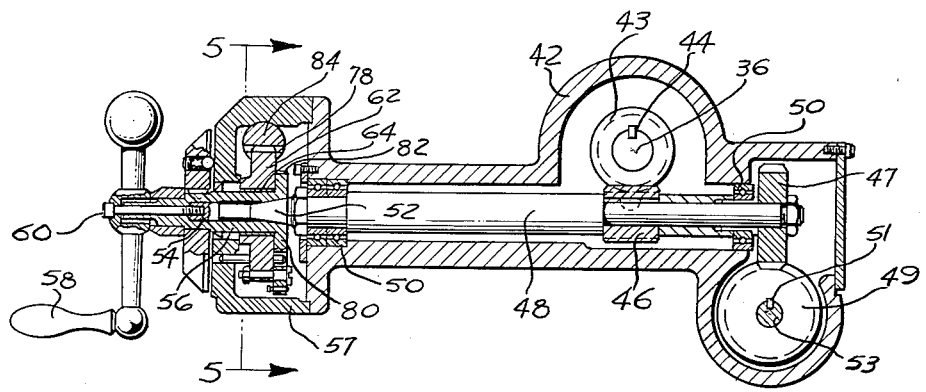
FIGURE 4 is a sectional view taken along line 4—4 of FIGURE 2 showing the ratchet feed mechanism.
Figure 5:
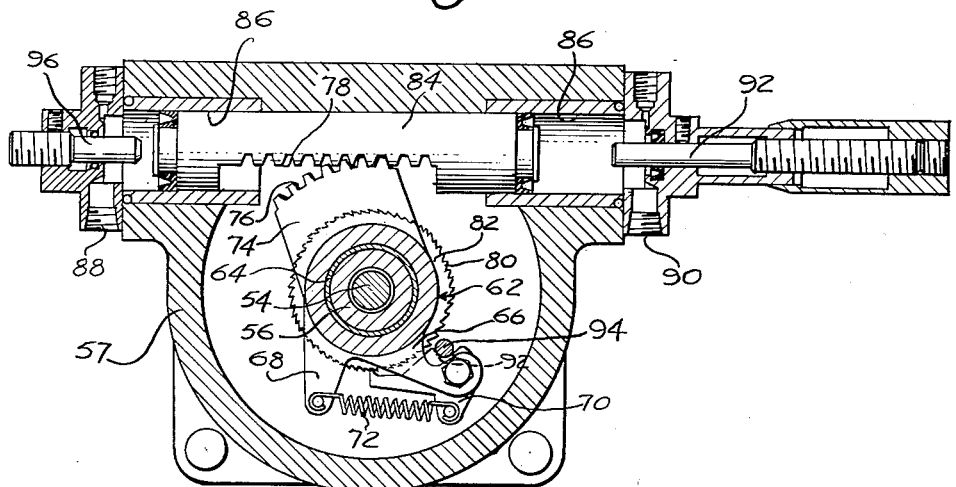
FIGURE 5 is a sectional view taken along line 5—5 of FIGURE 4 also showing the ratchet feed mechanism.
Figure 11:
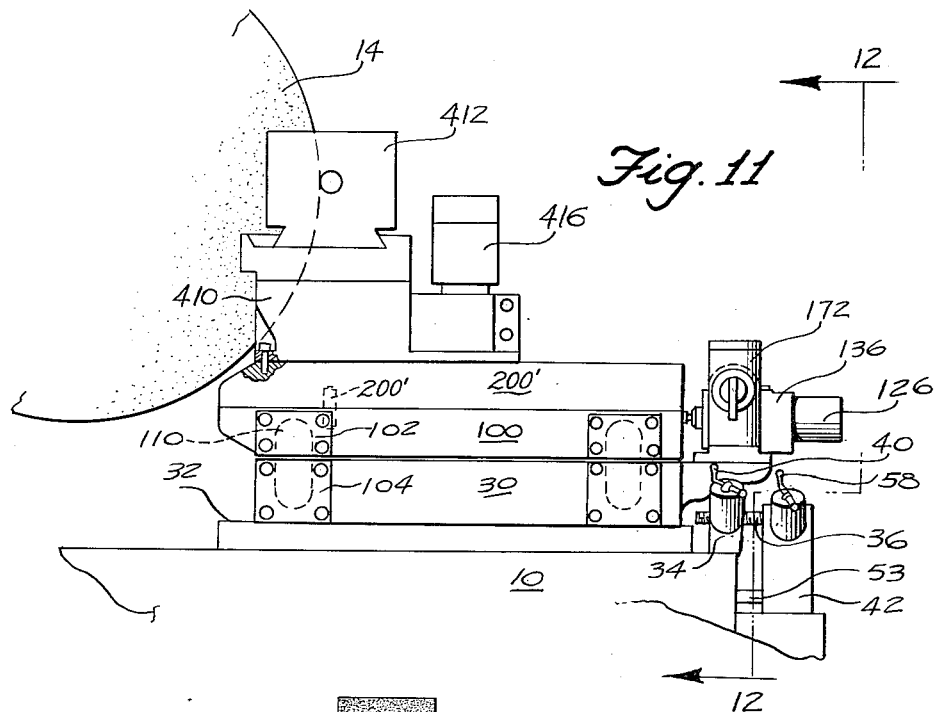
FIGURE 11 is a view showing a different application of the basic invention.
Figure 12:
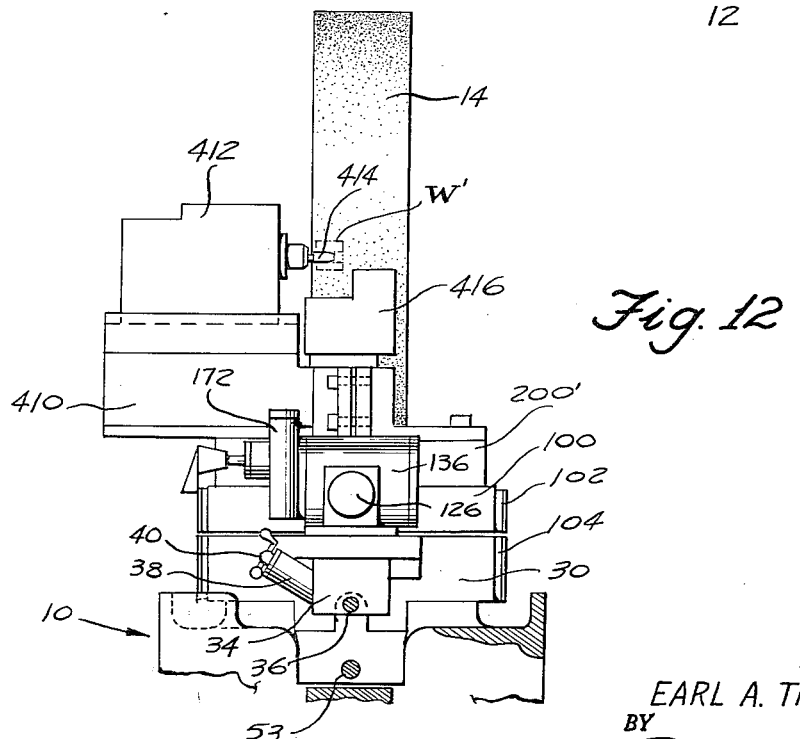
FIGURE 12 is a view taken along line 12—12 of FIGURE 11.

Each time the grinding wheel 14 is retrued by the dressing mechanism 28, the workrest 20 must be moved radially closer to the grinding wheel to compensate for material removed from the wheel by the dressing operation. Within the housing 42 on the base 10 there is provided automatic means for moving the base slide 30 and consequently the workrest 20 toward the grinding wheel. Referring to FIGURES 2, 4 and 5, the automatic advancing means which constitutes part of the multipurpose base assembly is shown in detail. Within the housing 42, the lead screw 36 has a worm wheel 43 keyed at 44 thereon. Worm gear 46 engages the worm wheel 43 and is rotatable by means of a shaft 48 journalled at 50 in the housing, and having toward one end a wedge taper portion 52, and beyond that a narrower portion which terminates in a tapped end 54. Surrounding the narrow end 54 of the shaft 48 is a hollow ratchet shaft 56 which also contains a hollow taper portion matching the portion 52 on the shaft 48. A ratchet feed box 57, later to be described, surrounds the shaft 56. A hand crank 58 secured by a bolt 60 to the end 54 of shaft 48 forces the ratchet shaft 56 securely against the wedge taper portion 52 and renders the shaft 48, the ratchet shaft 56, and the hand crank 58 a unitary structure by which the worm gear 46 may manually be rotated. Thus either hand crank 40 or 58 may be used to move the base slide 30 along ways 32, and the crank structure that is not being used will, through its self-locking worm gear-worm wheel connection, remain stationary so that the hand crank that is being used will be effective to move the base slide 30 in relation to the base 10.

Worm gear shaft 48 extends in housing 42 beyond the worm gear 46 and has secured to its other end a cross gear 47 meshing with another cross gear 49 keyed at 51 to a shaft 53 which runs the length of the machine, see FIGURES 2, 4, and 11 through 14. Shaft 53 operates at the other end of the machine a chain 55 or similar connecting mechanism associated with the grinding wheel dressing apparatus 28 by means of a one-way ratchet feed box 57' similar to that associated with the hand crank 58. Thus, as the base slide 30 is moved by rotation of worm wheel shaft 48 toward the grinding wheel, the dressing apparatus 28 is also automatically advanced toward the wheel by the same, controlled amount.

Feed box 57 serves to automatically rotate the worm gear shaft 48 to advance support 30 on its ways 32 and advance the dressing apparatus 28, this automatic mechanism being designed to be actuated prior to each dressing operation. An oscillating member 62 journaled by means of annular bronze bearing sleeve 64 around the ratchet shaft 56 has two radially extending ears 66, 68 to which a pawl 70 and its actuating spring 72 are attached, respectively, and a third radially extending ear 74 including segmental gear teeth 76 which mesh with rack teeth 78 on a piston, to be described. Pawl 70 engages the teeth 80 of an annular ratchet 82 formed integral with the ratchet shaft 56. As the oscillating member 62 oscillates clockwise (FIGURE 5), the point of the pawl 70 engages the teeth 80 of the rotary ratchet 82 and rotates the worm gear shaft 48, thus rotating the lead screw 36 and longitudinal shaft 53.

Oscillating member 62 is rotated clockwise once prior to each dressing operation by reciprocation of a piston 84, having the described teeth 78, which reciprocates in two aligned cylinder sections 86. Connections 88, 90 serve to admit oil against either end of piston 84 thus making it a double acting hydraulic motor. As oil is admitted through the connection 88 at the left-hand end of cylinder 86, piston 84 moves to the right (FIGURE 5) and oscillates the member 62 clockwise. This serves to rotate lead screw 36 and longitudinal shaft 53 to advance both the base slide 30 and the dressing apparatus 28 toward the grinding wheel. As oil is admitted through the other connection 90 on the right-hand end of cylinder 86, piston 84 reciprocates back to the left and turns the oscillating member 62 counter-clockwise but in this direction the pawl 70 rides over the inclined face of the teeth 80 of ratchet 82 and does not rotate the shaft 48, as is well known. The length of the stroke of piston 84 and thus the amount of oscillation of member 62 and consequent amount of rotation of lead screw 36 and shaft 53 is closely controlled by an adjustable limit stop 92 in the right-hand end of the cylinder 86.

Means is also provided for rendering the worm gear shaft 48 rotatable manually in either direction against the braking action of the pawl and ratchet by means of the hand crank 58 when the fluid motor is at rest. Pawl 70 has a face 92 designed to abut a fixed pin 94 as the piston 84 returns to its rest position against a stop 96 at the left-hand end of cylinder 86. As piston 84 moves to the right by admission of oil through the connection 88, face 92 of pawl 70 moves away from fixed pin 94 allowing the pawl spring 72 to urge the pawl into engagement with the ratchet teeth 80; and, as the piston 84 returns to its rest position against stop 96, the last bit of oscillation of member 62 again urges face 92 of pawl 70 against the pin 94 and swings the point of the pawl out of engagement with the ratchet teeth. This allows worm gear shaft 48 to be rotated in either direction by means of the hand crank 58. In the position shown in FIGURE 5, piston 84 has just moved away from the adjustable stop 96 and the pawl is just moving away from the fixed pin 94 and into engagement with the ratchet teeth 80.

Lead screw 36 is thus used to incrementally advance base support or slide 30 prior to each dressing operation and also, by means of hand crank 40, to position base slide 30 and consequently workrest 20 for various size workpieces, changing grinding wheels, or other infrequent operations. Generally, lead screw 36 would also be used to move the workrest 20 toward and away from the face of the grinding wheel with each workpiece as it is successively presented for grinding; however, it will be appreciated that, as the wheel grows smaller from many dressing operations, workrest 20 will be fed into the face of the wheel by different portions of the lead screw; any error encountered in the threads along the length of the lead screw will result in variations in the final size of the workpieces. This invention overcomes this difficulty by providing as part of the basic convertible assembly a second carrier 100 above the base slide 30, the exclusive function of which is moving or feeding the workpiece toward and from the face of the wheel on successive grinding operations. The carrier 100 is mounted for motion on the base slide 30 by means of novel anti-friction ways which effectively overcome any "stick-slip" frictional problems and also precisely guide the the movement of the carrier 100 in the direction intended without any misalignment.

Carrier 100 has four bearing blocks 102 thereon, two on each side (FIGURES 1–3 and 6); base slide 30 also has four similar bearing blocks 104 securely mounted thereon, one beneath each of the bearing blocks 102 of the carrier 100. Carrier 100 and base slide 30 have cutout portions 106, 108 respectively, on their adjacent faces intermediate the locations where bearing blocks 102 and 104 are secured. These cutouts are provided to allow room for two torsion bar parallel link members 110.

The bars 110 have the upper portions 112 of each side journalled in the opposite bearing blocks 102 on the carrier 100, and the lower portions 114 of each side journalled in the opposite bearing blocks 104 on the base slide 30. Each side of each bar 110, where it is journalled at 112 and 114, is in effect a pivotal linkage between carrier 100 and base slide 30, the four sides of the two bars forming a double parallel linkage system between the carrier and the base slide, and each bar itself serving to interconnect the two fore linkages and the two aft linkages, respectively. While a bar of any shape may be used, the preferred embodiment utilizes a bar having enlarged sides and an interconnecting portion 116 which is generally round in cross section. The entire bar 110 is made of material having qualities of resistance to torsional forces such that the round interconnecting section 116 insures precise parallelism between the upper and lower pivots 112, 114 on each of its sides under normal working loads. Thus, as the carrier 100 is moved generally horizontally through a very short circular arc about pivot points 114, any tendency for the carrier to wobble or sway out of alignment with its direction of travel will immediately be overcome by torsion member 116, and the carrier 100 will have smooth, precise, almost friction-free motion for its short (usually measured in fractions of an inch) length of travel.

On an in-feed grinding machine, the workpiece rests between the work rest 20 and the regulating wheel 24, and these two members are moved back away from the face of the grinding wheel (maintaining their same interrelationship) while the finished workpiece is ejected from the rest 20 and a new workpiece is fed onto the rest. Then, usually by means of a lead screw, the workrest and regulating wheel are moved again toward the face of the grinding wheel until the workpiece contacts the wheel and is treated thereby. The same rate of movement is ordinarily used for bringing the workpiece up to the wheel as well as for pushing the workpiece against the wheel during the actual grinding operation. However, by use of the carrier 100, this invention may utilize a two-speed feed mechanism which cuts the time in which the workpiece is brought into position against the wheel to a bare minimum. First, the workpiece on its workrest 20 and against regulating wheel 24 is moved rapidly toward the face of the grinding wheel (for instance, for ten thousandths of an inch) until contact is almost made between the workpiece and the grinding wheel; then, a slow, closely controlled rate of speed as the work is being treated (for instance, for one thousandth of an inch) may be provided. Consequently, a great deal of time is saved, comparatively, by making the long approach feed very rapid while the shorter treating feed is necessarily at a controlled, slower rate.

The means for feeding first at a rapid and then at a slower rate which also comprises a feature of the convertible basic assembly is shown in FIGURES 7 through 10, inclusive. Viewing FIGURE 7, the link supported carrier 100 and the base slide 30 in relation to which it moves are fragmentally shown. Threaded at 118 into the end of the carrier 100 is a shaft 120 made of flexible steel and terminating in a piston 122 reciprocable in a cylinder 124 formed in a housing 126 attached to the base slide 30. Oil under pressure admitted through a connection 128 continually urges the piston 122 toward the the right-hand end of the cylinder 124 and consequently biases the carrier 100 away from the grinding wheel.

The motion away from the wheel is limited by the smooth face 128 of a block 130, which is also secured to the carrier 100 by means of the screw threads 118, abutting the end of a hollow shaft 132 journalled in sleeve bearings 134 in the housing 136. Hollow shaft 132 has an enlarged annular portion 138 (FIGURE 8) which includes at least one tapered groove 140 into which a similarly tapered key 142 is urged by a spring 144, thus securing shaft 132 against rotary motion, but allowing it to have reciprocatory motion. As the shaft 132 moves to the left in FIGURE 7, it pushes against the smooth face 128 of the block 130 on carrier 100, and carrier 100 swings toward the grinding wheel about pivot points 114 on the base slide 30. Since the motion of carrier 100 is arcuate and not precisely rectilinear, a very small amount of up and down motion will accompany the limited forward motion. This is absorbed by the yieldable shaft 120, which will flex upwardly as carrier 100 moves upwardly with its smooth face 128 sliding on the end of the nonflexing hollow shaft 132.

Hollow shaft 132 is in effect a travelling lead screw with threads 146 thereon which mate with the threads of a rotating nut 148 journalled in rugged bearings 150 in housing 136. Around the periphery of nut 148 are gear teeth 152 engaged by opposed racks for turning the nut. As nut 148 is rotated, hollow shaft 132 will move carrier 100. The racks are part of a double headed fluid motor 154 which comprises an upper cylinder 156 and a lower cylinder 158, each having a piston 160 reciprocable therein. Each piston has rack teeth thereon which engage on opposite sides with the teeth 152 around the periphery of nut 146. Oil for moving the upper piston 160 to the left (and lower piston 160 to the right) is admitted to cylinder 156 through a connection 162, and oil for rotating the nut in the other direction is admitted through a connection 164 to lower cylinder 158 to move lower piston 160 to the left (and upper piston 160 back to the right). Motor 154 is for affecting the aforementioned rapid advance of the workpiece toward the face of the grinding wheel.

The length of this rapid advance is regulated by an adjustable stop 166, against which the upper piston 160 abuts at the end of its stroke, mounted in a hollow guide shaft 168 in relation to which it is adjustable by means of a screw thread connection 170. Hollow guide shaft 168 is supported in an extension 172 of the housing 136 by means of bearings 174 and another screw thread connection 176.

For effecting the slow feed which follows the rapid advance, guide shaft 168 has gear teeth 178 peripherally mounted therearound which mesh on either side with rack teeth on pistons 180, 182 of a second double headed hydraulic motor 184 in the housing extension 172, see FIGURE 10. Oil for actuating the motor 184 by moving piston 182 downwardly within its cylinder 183 is supplied through a connection 185, and oil for returning the piston 180 in the opposite direction in its cylinder 187 is supplied through a connection 186.

As piston 160 of motor 154 is shot rapidly to the left by admission of oil through port 162, nut 148 is rotated and serves to advance the hollow shaft 132 and thus move the carrier 100 toward the face of the grinding wheel; when piston 160 contacts the adjustable limit stop 166, the rapid feed comes to a stop. At this time, oil is admitted through the connection 185 which moves piston 182 of the second hydraulic motor 184 downwardly and rotates hollow guide shaft 168 which, by means of screw connection 176 in housing 172, causes the shaft 168 and its associated limited stop 166 to be drawn slowly to the left as viewed in FIGURE 9. Consequently, as the limit stop 166 backs off to the left at a controlled speed and for a controlled distance, oil in cylinder 156 continues to urge the piston 160 against the limit stop 166, and the teeth on piston 160 continue to rotate the nut 148 very slowly and advance carrier 100 (by means of hollow lead screw shaft 132) in an accurately controlled manner. The final advance of the workpiece toward the grinding wheel, during which the grinding operation is completed, finds the movable parts 146, 148 of the lead screw feeding connection always interrelated in the same position, with the same threads on rotating nut 148 coacting with the same threads 146 on hollow lead screw shaft 132, thus eliminating any lead screw error in the final portion of each successive feeding movement.

Figure 15:
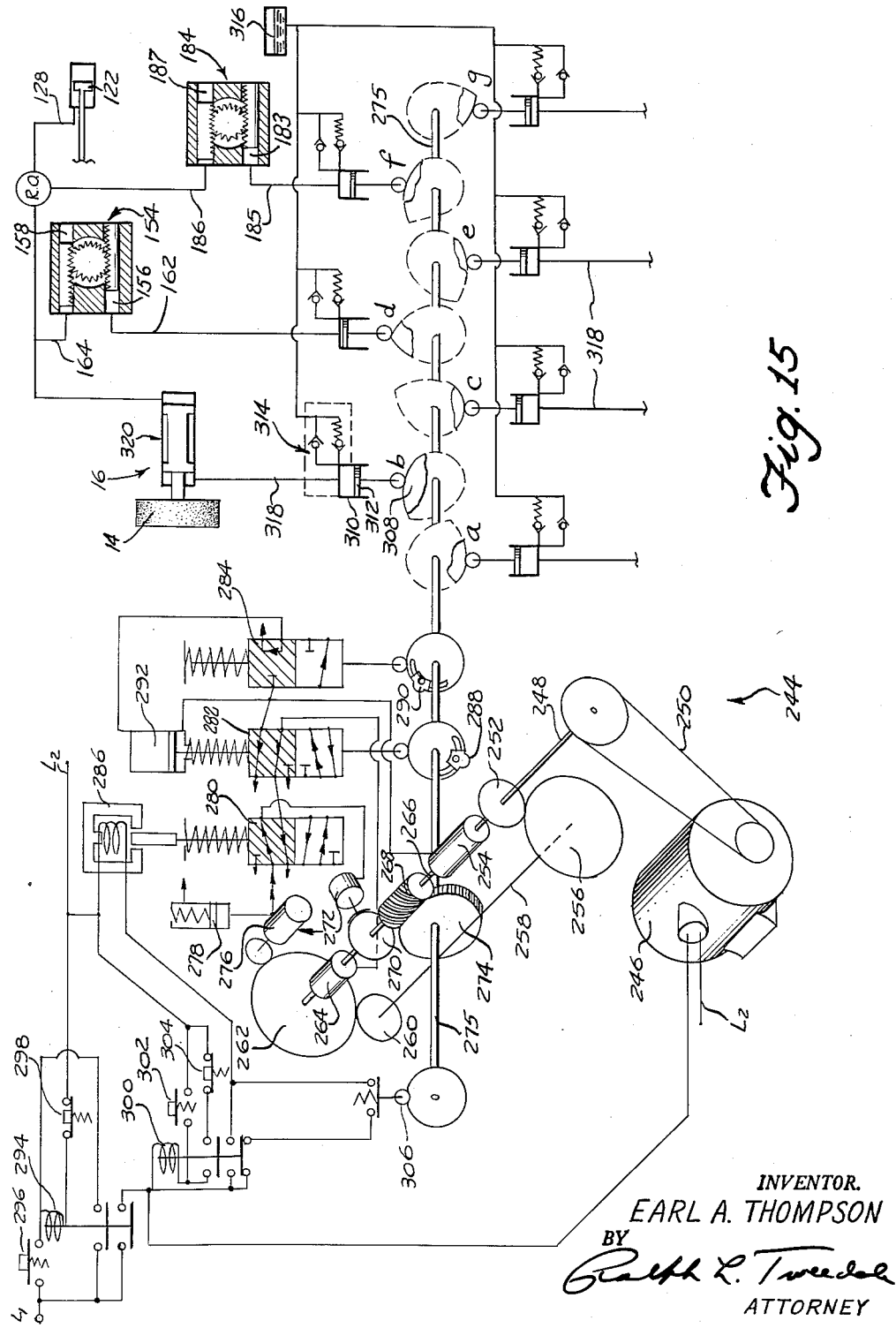
FIGURE 15 is a view in schematic fashion of the mechanico-hydraulic power and control unit utilized by this invention.

The mechanico-hydraulic or cam-actuated liquid column type motion transfer unit for powering and controlling the various fluid motors is schematically shown in FIGURE 15. The drive unit 244 includes a motor 246 which is arranged to drive a self-controlled two-speed transmission which is shown in the left-hand half of the figure. The motor drives the input shaft 248 of the transmission through a belt drive 250. The input shaft 248 drives a pinion 252 and also the input member of a hydraulically engaged, spring released clutch 254. Pinion 252 drives a gear 256 secured to a countershaft 258 which carries pinion 260 at its opposite end. Pinion 260 drives a gear 262 and therewith constitutes a set of speed change gears.

Gear 262 drives the input member of a second hydraulically engaged, spring released clutch 264. The driven members of the clutches 254 and 264 are secured to the opposite end of a shaft 266 having a worm 268 thereon and a brake drum 270. The latter has a spring biased hydraulic motor 272 for engaging the brake. The worm 268 drives a worm wheel 274 secured to the main cam shaft 275.

For the purpose of automatically controlling the starting, stopping and speed of the transmission, there is provided a hydraulic control pump 276 driven from gear 262 which may circulate a body of oil contained in the transmission housing for control and lubricating purposes. The pump 276 may deliver to a combined accumulator and relief valve comprising a spring loaded piston 278, and may also supply oil to a bank of control valves 280, 282 and 284. In the diagram, each valve is shown as a two-positioned valve spring biased to the position illustrated in which the connections shown in the cross-hatched rectangles are established. Single-headed arrows are used to indicate flow at reservoir pressure, and double-headed arrows to indicate flow at pump delivery pressure. Each of the valves, when shifted, establishes the connections shown in the unhatched rectangles immediately below the hatched rectangles.

Valve 280 is arranged to be shifted by solenoid 286. Valves 282 and 284 are arranged to be shifted by the adjustable cams 288 and 290, respectively, which are positioned on camshaft 275. In addition, valve 282 has a hydraulic holding cylinder 292 which holds the valve 282 in its shifted position until it is released by the shifting of valve 284. Valve 280 in the position shown delivers pressure fluid to engage the brake 272 and supplies pressure fluid to engage the low speed clutch 264, subject, however, to a conjoint control at valve 282.

The latter valve, in the position illustrated, exhausts fluid to release the high speed clutch 254 and places the low speed clutch 264 under the control of valve 280. In the shifted position, valve 282, provided valve 280 has been shifted, delivers pressure fluid to engage high speed clutch 254 and exhausts fluid to release low speed clutch 264. As previously explained, the valve 284 is merely a reset valve for by-passing the holding cylinder 292 to permit valve 282 to return to its spring biased position shown on the drawing.

Thus, energization of solenoid 286 will start the camshaft rotating at slow speed; thereafter, the cam 288 will shift the transmission to drive the camshaft at high speed; and, still later, the cam 290 will again shift the transmission to low speed. So long as the solenoid 286 remains energized, camshaft 275 will continue to rotate, first at a slow speed and then at a high speed during each revolution, controlling its own speed changes by operation of cams 288 and 290.

For the purpose of controlling the drive motor 246 and the solenoid 286, there is provided an electric control circuit connected between a pair of electric supply lines designated $L_1$ and $L_2$. The circuit may include a master relay 294 of the holding type having a manual master start switch 296 and a manual master stop switch 298. Relay 294 controls the motor 246 and also a cycle control relay 300 of the holding type, having a manual cycle start switch 302 and a manual cycle stop switch 304. The normally open contacts of relay 300, which are of the make-before-break type, control energization of cycle solenoid 286 directly. The normally closed contacts of relay 300 also control solenoid 286, but are in series with cam switch 306 mounted on the left end of the master camshaft 275 and arranged to be opened once during each revolution thereof. The arrangement is such that when the cycle stop switch 304 is operated at any point in the rotation of camshaft 275, relay 300 will be de-energized but solenoid 286 will remain energized until the cam switch 306 opens at the predetermined stopping point. Operation of the master stop switch 298, however, will de-energize solenoid 286 immediately regardless of the point in the cycle and will also de-energize motor 246.

The master camshaft 275 drives a number of cam operated hydraulic pulsator sections designated $a$ through $g$, inclusive. Each section may comprise a cam 308 secured to the camshaft 275 and having a contour composed of predetermined rise and fall ramps designed to produce the motion sequences desired for one of the movable parts of the machine. Each section may comprise a single-acting pulsator cylinder 310 having a piston 312 operated by the follower for the cam 308. The head of each cylinder 310 may contain a balancing valve assembly 314 comprising an outwardly opening pressure relief valve and an inwardly opening replenishing valve, each of which is connected to a reservoir 316 which is preferably pressurized at low, superatmospheric pressure.

Each pulsator cylinder 310 communicates by a closed liquid column conduit 318 with one of the hydraulic motors of the machine and thus they together constitute a liquid column type motion transfer system for transmitting the motion of the cam follower to the machine element which is connected to the piston of the fluid motor. Thus, the liquid column 318 of the section $b$ is connected to the head end of a fluid motor 320 for oscillating the grinding wheel 14. Section $d$ is connected to the cylinder 156 of motor 154 for rapidly advancing carrier 100. Section $f$ is connected to motor 184 for slowly controlling the feed motion of carrier 100. Sections $a$, $c$, $e$ and $g$ are used for various other automatic fluid motor actuated devices related to grinding machine operation, such as loading mechanism for automatically feeding workpieces sequentially to their work position prior to the grinding operation and removing them when the operation is finished.

Each of the fluid motors operates between limit stops which are so arranged that the total displacement of each fluid motor is slightly less than the displacement of the piston 312 in cylinder 310, thus at the end of each advancing stroke a small quantity of fluid is blown over the relief valve to the reservoir 316. During the latter part of each return stroke the replenishing valve permits the fluid to be returned as well as any small amount that may have leaked out of the liquid column.

For the purpose of returning each of the fluid motors and their respective transmitter pistons 312, the opposite end of each fluid motor is connected with a plenary volume source of fluid under high pressure which is indicated diagrammatically by the circle RO. It is preferred to utilize a gas loaded liquid accumulator as the high pressure source, although it will be understood that other sources such as spring or weight loaded accumulators, variable displacement pumps with pressure compensation, or fixed displacement pumps with relief valve means may be utilized. Oil under pressure from source RO is also utilized to bias the piston 122 in its cylinder 124 in the manner of a hydraulic spring for holding smooth face 128 of block 130 on feed carrier 100 back against the abutting end of the hollow shaft 132 on the base slide 30.

The rapid portion of each rotation of camshaft 275 is utilized for the non-work performing functions of the grinding machine cycle which desirably should be accomplished as rapidly as possible. The slower portion of the rotation of camshaft 275 is utilized when work is being performed by the grinding wheel on the workpiece, and a more precise control is desired. Thus a more gradual rise on a cam may be employed during the faster portion of the camshaft rotation to give more definite and positive control of non-work performing functions than would the steep rise on a constant speed cam. Consequently, the loading and unloading of successive workpieces and the rapid advance of the workpiece toward the face of the grinding wheel are accomplished in a minimum amount of time, and then the workpiece is urged against the grinding wheel for the exact time desired and at a precisely controlled rate. Immediately upon completion of operation on the workpiece by the grinding wheel, the rapid portion of the camshaft revolution comes into play: the workrest which supports the finished workpiece is rapidly moved away from the face of the grinding wheel; the finishing workpiece is replaced by a new workpiece; and the workrest moves the new workpiece rapidly to a location immediately adjacent the grinding wheel. Then, the slow portion of the camshaft rotation comes into play and the new workpiece is urged against the face of the grinding wheel for a controlled amount of time in completion of a cycle.

Thus a liquid column type motion transfer power and control unit is provided which, merely by the replacement of cams, can be adapted to power and control an unlimited variety of programmed motions in any grinding or other machine tool operation. This drive unit combined with the novel torsion bar interconnected parallel link carrier for accurate two-speed feeding of a workpiece to a tool such as a grinding wheel may be incorporated with various types of operations.

The entire structure so far described thus constitutes a convertible base assembly upon which structural elements for supporting different types of workpieces for many different grinding operations can be mounted. One type of equipment which can readily be installed upon the feeding carrier 100 of this mechanico-hydraulically powered and controlled base assembly is the equipment illustrated on the base assembly in FIGURES 1, 2 and 3. This equipment provides for in-feed centerless type grinding operations.

In order to accomplish bevelling, shouldering or other grinding operations on an in-feed grinding machine, it is desirable to provide a swivel plate 200 rotatable about a swivel pin 202. In this case, the swivel plate 200 is mounted on the feeding carrier 100, the swivel point 202 preferably being located directly beneath the center of the work rest 20. Means such as a bolt 204 engaging an arcuate slot 205 is utilized to secure the swivel plate in any desired angular location upon the carrier 100. The work rest 20 is also pivotally secured to the swivel plate and may move therewith or be positioned parallel with the working face of the grinding wheel.

Dovetail ways 206 along the upper face of swivel plate 209 mate with ways on a regulating wheel support 210. A lead screw 212 is rotatably mounted in an upstanding extension 214 of the swivel plate 200, and extends into threaded engagement with the regulating wheel support 210. Rotation of the lead screw 212 by means of a worm wheel 216 keyed thereon and a worm gear 218 serve to move the regulating wheel support 210 along ways 206. A motor 220 associated with the regulating wheel for driving it is provided, as are other means such as an abutment 219 engaging a positioning screw 217 on the support 210 for adjusting the tilt of the regulating wheel about an axis A lying in the plane in which the axes of the grinding wheel and the regulating wheel lie at the completion of the feeding movement.

Thus, in operation, the workrest 20 and the regulating wheel 24 which together form a support for the workpiece W may be located by means of a hand crank 40 and lead screw 36 the proper distance from the surface of the grinding wheel 14 for the workpiece that is to be ground. Prior to each dressing operation of the grinding wheel by the apparatus 28, both the dressing apparatus 28 and the base slide 30 are automatically moved incrementally closer to the grinding wheel by the fluid motor actuated ratchet mechanism in the housing 42. When the regulating wheel 24 is dressed—a very infrequent operation—and a certain amount of material removed from the periphery thereof, the regulating wheel support 210 can be moved to again position the regulating wheel the proper distance from the workrest 20 by means of the lead screw 212. Neither of these lead screws 36 and 212 are used for the sequential in-feeding of successive workpieces to the face of the grinding wheel, this operation being accomplished exclusively by the carrier 100 as it moves relative to the base slide 30 on parallel links which are interconnected by torsion bars 116 to insure constant parallelism between the links. The work is fed, first rapidly by motor 154 and then slowly, while the work is being treated by the grinding wheel, by motor 184. These motors are powered by the mechanico-hydraulic programmed driving unit. If desired, the angle of the workpiece resting on work rest 20 and against regulating wheel 24 can be changed in relation to the peripheral working face of the grinding wheel by moving the swivel plate 200 about its swivel 202 on the feed carrier 100, and the regulating wheel may be canted about the axis A by screw 217.

However, many types of work performing equipment other than centerless grinding equipment can be located on the multi-purpose base assembly. For instance, in FIGURES 11 and 12, a chucking grinding operation is semi-schematically shown which utilizes the same base assembly with the mechanico-hydraulic powered and controlled two-speed parallel link feeding carrier for feeding the work. The swivel plate 200' movable about pin 202' will support, however, a spindle mounting 410 which adjustably mounts a powered work holding spindle 412 which may hold or grip a workpiece W' either by means of an expanding chuck 414, as shown, or by means of an externally gripping collet. Loading mechanism for supplying new workpieces to the spindle is schematically indicated at 416. Thus, simply by replacing the structure above the swivel plate 200, the basic grinding machine base assembly can easily be converted to handle different types of grinding operations.

The convertibility of the basic assembly is further illustrated in FIGURES 13 and 14, where a between centers grinding operation is also achieved by simply replacing the structure above the swivel plate 200", adjustable by means of locking bolts 204" about a swivel pin 202" on the feed carrier 100, and having guide ways 206" which run at right angles to the ways 206 on the previously described swicel plate 200. Slideable on ways 206" is a spindle support 510 which adjustably mounts a work holding center 512 and an axially retractable center 514 mounted on a fluid retracting means 516 for gripping a workpiece W". Loading mechanism may be located at 518 for supplying new workpieces to the centers.

In all three of the disclosed types of grinding operations, the pivoted link mounted carrier 100 of this invention is used exclusively for feeding successive workpieces to the grinding wheel, preferably with a two-speed motion powered and controlled by a cam actuated liquid column type programming unit. Merely by converting the means for holding the workpiece to the type of operation desired, a multi-purpose base assembly with precision feed mechanism is provided.

Both the pivoted link carrier and the two-speed feed mechanism can readily be adapted, separately or in combination, to any machine tool operation in which mass produced workpieces are presented successively to a tool. This invention is obviously not limited to use in various types of grinding operations.

While the single above described embodiment constitutes a preferred mode of carrying out this invention as illustrated in relation to several types of grinders, other forms of the basic invention might readily be adopted within its actual scope; consequently, the invention is variously claimed as:

1. Precision workpiece feed mechanism for a machine tool, comprising: a base; two carriers on the base; a workpiece holder and a tool, one carried by each carrier; means permitting relative movement between the holder and the tool, the means including a first pair of spaced, aligned pivot points on one carrier, a bar having two sides, each side being connected to one of the first points, a second pair of spaced, aligned pivot points on the base parallel with the first pair of points, each side of the bar being also connected to one of the second points, and the bar having qualities of resistance to torsional forces adequate to insure parallelism between the two aligned pairs of pivot points under normal working loads.

2. Precision workpiece feed mechanism for a machine tool, comprising: a base; two carriers on the base; a workpiece holder and a tool, one carried by each carrier; means permitting relative movement between the holder and the tool, the means comprising two units, each of the units including a first pair of spaced, aligned pivot points on one carrier, a bar having two sides, each side being connected to one of the first points, a second pair of spaced, aligned pivot points on the base parallel with the first pair of points, each side of the bar being also connected to one of the second points, the pairs of aligned pivot points in each of the two units being parallel, and the bar having qualities of resistance to torsional forces adequate to insure parallelism between the two aligned pairs of pivot points under normal working loads.

3. Precision workpiece feed mechanism for a machine tool, comprising: a base; two carriers on the base; a workpiece holder and a tool, one carried by each carrier; means permitting relative movement between the holder and the tool, the means comprising two units, each of the units including a first pair of spaced, aligned pivot points on one carrier, a bar having two sides, each side being connected to one of the first points, a second pair of spaced, aligned pivot points on the base parallel with the first pair of points, each side of the bar being also connected to one of the second points, the pairs of aligned pivot points in each of the two units being parallel and the distance between the two first pairs of pivot points of each unit being equal to the distance between the two second pairs of pivot points of each unit and the bar having qualities of resistance to torsional forces adequate to insure parallelism between the two aligned pairs of pivot points under normal working loads.

4. Precision workpiece feed mechanism for a machine tool, comprising: a base; two carriers on the base; a workpiece holder and a tool, one carried by each carrier; means permitting relative movement between the holder and the tool, the means including a first pair of spaced, aligned pivot points on one carrier, a bar having two sides, each side being connected to one of the first points, a second pair of spaced, aligned pivot points on the base parallel with the first pair of points, each side of the bar being also connected to one of the second points, and the bar having qualities of resistance to torsional forces adequate to insure parallelism between the two aligned pairs of pivot points under normal working loads; means limiting the relative movement when a predetermined minimum distance exists between the holder and the tool; and a lead screw feeding arrangement interconnecting the base and the one carrier for causing the relative movement until the minimum distance exists.

5. Precision workpiece feed mechanism for a machine tool, comprising: a base; two carriers on the base; a workpiece holder and a tool, one carried by each carrier; means permitting relative movement between the holder and the tool, the means including a first pair of spaced, aligned pivot points on one carrier, a bar having two sides, each side being connected to one of the first points, a second pair of spaced, aligned pivot points on the base parallel with the first pair of points, each side of the bar being also connected to one of the second points, and the bar having qualities of resistance to torsional forces adequate to insure parallelism between the two aligned pairs of pivot points under normal working loads; means limiting the relative movement when predetermined minimum and maximum distances exist between the holder and the tool; and means causing the movement from the minimum to the maximum distance and the first portion of the movement from the maximum to the minimum distance at a speed greater than the remaining portion of the movement from the maximum to the minimum distance.

6. Precision workpiece feed mechanism for a machine tool, comprising: a base; two carriers on the base; a workpiece holder and a tool, one carried by each carrier; means permitting relative movement between the holder and the tool, the means including a first pair of spaced, aligned pivot points on one carrier, a bar having two sides, each side being connected to one of the first points, a second pair of spaced, aligned pivot points on the base parallel with the first pair of points, each side of the bar being also connected to one of the second points, and the bar having qualities of resistance to torsional forces adequate to insure parallelism between the two aligned pairs of pivot points under normal working loads; means for causing the relative movement including a fluid motor operable between the holder and the tool, a rotary cam actuated pulsator, and a liquid column connecting the pulsator with the motor whereby the relative movement will follow a programmed sequence.

7. Precision workpiece feed mechanism for a grinding machine, comprising: a base; two supports on the base; a grinding wheel and a carrier, one on each support; means on the base permitting to-and-fro motion relative thereto of one of the supports in one direction; means associated with the carrier and its support permitting to-and-fro motion of the carrier relative to its support in the one direction including pairs of twin links interconnecting the carrier and its support, each link being parallel with its twin, means formed as a unit with both links of a pair and extending therebetween to resist torsional forces and insure parallelism between both links of a pair under normal working loads; a workpiece holder on the carrier; and means for effecting the two motions in the one direction.

8. Precision workpiece feed mechanism for a grinding machine, comprising: a base; two supports on the base; a grinding wheel and a carrier, one on each support; means on the base permitting to-and-fro motion relative thereto of one of the supports in one direction; means associated with the carrier and its support permitting to-and-fro motion of the carrier relative to its support in the one direction including pairs of twin links interconnecting the carrier and its support, each link being parallel with its twin and the said pairs of twin links also being parallel with each other, means formed as a unit with both links of a pair of extending therebetween to resist torsional forces and insure parallelism between both links of a pair under normal working loads; a workpiece holder on the carrier; and means for effecting the two motions in the one direction.

9. Precision workpiece feed mechanism for a grinding machine, comprising: a base; two supports on the base;

a grinding wheel and a carrier, one on each support; means on the base permitting to-and-fro motion relative thereto of one of the supports in one direction; means associated with the carrier and its support permitting to-and-fro motion of the carrier relative to its support in the one direction including pairs of twin links interconnecting the carrier and its support, each link being parallel with its twin, means formed as a unit with both links of a pair and extending therebetween to resist torsional forces and insure parallelism between both links of a pair under normal working loads; a workpiece holder on the carrier; and means for effecting the two motions in the one direction, the means for effecting motion of the carrier relative to its support including a lead screw feeding arrangement interconnecting the carrier and its support; and means limiting relative motion between the carrier and its support.

10. A base assembly for grinding machines, comprising: a base; two supports on the base; a grinding wheel and a carrier, one on each support; means on the base permitting to-and-fro motion relative thereto of one of the supports in one direction; means for effecting the motion; pivoted link means interconnecting the carrier and its support permitting to-and-fro motion of the carrier relative to its support also in the one direction; two-speed driving means for effecting the motion of the carrier relative to its support; a rotary cam actuated liquid column type motion transfer device for powering and controlling the driving means; the carrier adapted to detachably mount a variety of workpiece holding equipment whereby a workpiece may be movably supported in relation to the grinding wheel.

11. A machine tool comprising a base, a member to be shifted to and fro relative to the base, and means forming an anti-friction mounting for the member including a first and second parallelogram linkage, one at each side of the member, and a pair of torsionally rigid connectors each joining a link of one parallelogram to a laterally spaced link of the other parallelogram whereby the member may partake of a limited translatory motion in an arcuate path.

12. A machine tool comprising a base, a member to be shifted to and fro relative to the base, and means forming an anti-friction mounting for the member including a first and second parallelogram linkage, one at each side of the member, and a pair of torsionally rigid connectors each joining a link of one parallelogram to a laterally spaced link of the other parallelogram whereby the member may partake of a limited translatory motion in an arcuate path and a set of ways having a slide shiftable thereon and forming a second support between the member and the base for translatory motion through a greater distance.

13. A machine tool comprising a base, a member to be shifted to and fro relative to the base, and means forming at least three compound slide-supports for the member, at least two of which are subject to sliding friction and at least one of which provides an anti-friction mounting for the member including a first and second parallelogram linkage, one at each side of the member, and a pair of torsionally rigid connectors each joining a link of one parallelogram to a laterally spaced link of the other parallelogram whereby the member may partake of a limited translatory motion in an arcuate path.

14. A machine tool comprising a base, a member to be shifted to and fro relative to the base, and means forming at least three compound slide-supports for the member, at least two of which are subject to sliding friction and at least one of which provides an anti-friction mounting for the member including a first and second parallelogram linkage, one at each side of the member, and a pair of torsionally rigid connectors each joining a link of one parallelogram to a laterally spaced link of the other parallelogram whereby the member may partake of a limited translatory motion in an arcuate path, independent lead screw actuators for each of the slide supports, a stop for terminating the motion of the lead-screw for the anti-friction mounted slide support at a single position along the lead screw, means for actuating the last named lead screw against the stop, and means for thereafter moving the stop to impart a final feeding motion to the member.

15. A machine tool comprising a base, a member to be shifted to and fro relative to the base, and means forming an anti-friction mounting for the member including a first and second interconnecting link, one at each side of the member, and a torsionally rigid connector joining the links to form therewith an integral supporting structure whereby the member may partake of a limited translatory motion in an arcuate path.

16. Feed mechanism for a grinding machine comprising a base, a grinding wheel mounted for rotation on the base, a wheel dressing mechanism mounted on the base, means connected to cause relative movement between the dressing mechanism and the wheel in small increments to establish the depth of the dressing cut, a workpiece manipulating mechanism mounted on the base for feeding workpieces successively to the wheel, means connected to cause relative movement between the manipulating mechanism and the wheel in correspondingly small increments to compensate for the depth of the dressing cut, and a single rotary cam powered and controlled liquid column type motion transfer device connected to operate both of the movement causing means whereby the two mechanisms partake of identical infeed movements.

17. A machine tool comprising a base supporting a work performing tool, a member to be shifted cyclically to-and-fro on the base relative to the tool, and means forming at least three compound slide-supports for the member, at least two of which are subject to sliding friction and at least one of which provides an anti-friction mounting for the member, feed means connected to the one slide-support to produce small increments of feed motion to-and-from the tool, compensating means connected to the other slide-supports to produce semi-permanent spacial adjustments between the tool and the member, and a workpiece handling mechanism on the member whereby the feed means operating the one anti-friction mounted slide exclusively generate the cyclical infeed motion of the workpiece to the tool.

18. A machine tool comprising a base supporting a work performing tool, a member to be shifted to-and-fro on the base relative to the tool, workpiece handling means on the member adapted to present workpieces successively to the tool, a two-speed feed means including a shiftable piston type fluid motor operatively connected between the base and the shiftable member and having a pair of limit stops to govern the stroke of the piston, one of the stops terminating rapid feed motion of the member toward the tool, and means for moving the one stop in a stroke increasing direction upon completion of the rapid feed motion to impart a final slower feeding motion to the shiftable member.

19. A machine tool comprising a base supporting a work performing tool, a member to be shifted to-and-fro on the base relative to the tool, workpiece handling means on the member adapted to present workpieces successively to the tool, a two-speed feed means including a shiftable piston type fluid motor operatively connected between the base and the shiftable member and having a pair of limit stops to govern the stroke of the piston, one of the stops terminating rapid feed motion of the member toward the tool, and means for moving the one stop in a stroke increasing direction upon completion of the rapid feed motion to impart a final slower feeding motion to the shiftable member, a second fluid motor connected to operate the last-named means, and a rotary cam powered and controlled liquid column type motion transfer device connected to operate the two fluid motors in timed sequence whereby workpieces are presented to the tool with a rapid approach motion followed by a slower feed motion.

20. A machine tool comprising a base member and a shiftable member supported thereon for to-and-fro motion relative to the base member, a lead screw interconnecting the members to cause the to-and-fro shifting motion, bearing means on one of the members supporting the lead screw for rotary and against axial motion, self-locking means connected with the bearing means normally preventing rotation of the lead screw, manual means for unlocking the self-locking means and selectively rotating the lead screw, a nut on the other member supported for rotary and against axial motion and threadably engaging the lead screw, self-locking means on the other member normally preventing rotation of the nut, and manual means for unlocking the self-locking means and selectively rotating the nut whereby the shiftable member may be moved relative to the base member by manual means located either on the base member or on the shiftable member.

References Cited in the file of this patent

UNITED STATES PATENTS

| | | |
|---|---|---|
| 1,818,675 | Cushman | Aug. 11, 1931 |
| 2,720,734 | Heckethorn | Oct. 18, 1955 |
| 2,904,936 | Veith | Sept. 22, 1959 |